United States Patent
Feng et al.

(10) Patent No.: US 11,890,519 B2
(45) Date of Patent: Feb. 6, 2024

(54) METHOD AND APPARATUS FOR IMPACT POSITION DETECTION OF IMPACT SPORT EQUIPMENT

(71) Applicant: National Tsing Hua University, Hsinchu (TW)

(72) Inventors: Yang Chih Feng, Hsinchu (TW); Chiang Liu, Hsinchu (TW); Hsi-Pin Ma, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 178 days.

(21) Appl. No.: 17/718,300

(22) Filed: Apr. 11, 2022

(65) Prior Publication Data

US 2023/0256311 A1    Aug. 17, 2023

(30) Foreign Application Priority Data

Feb. 16, 2022   (TW) .................................. 111105528

(51) Int. Cl.
| | |
|---|---|
| A63B 60/46 | (2015.01) |
| A63B 24/00 | (2006.01) |
| G01N 29/46 | (2006.01) |
| G06N 20/00 | (2019.01) |

(52) U.S. Cl.
CPC .......... *A63B 60/46* (2015.10); *A63B 24/0021* (2013.01); *G01N 29/46* (2013.01); *G06N 20/00* (2019.01); *A63B 2220/53* (2013.01); *A63B 2220/64* (2013.01); *A63B 2220/833* (2013.01)

(58) Field of Classification Search
CPC . A63B 60/46; A63B 24/0021; A63B 2220/53; A63B 2220/64; A63B 2220/833; G01N 29/46; G06N 20/00; G06N 3/0464; G06N 5/01; G06N 20/10

USPC ................................................... 473/223, 409
See application file for complete search history.

(56) References Cited

FOREIGN PATENT DOCUMENTS

| | | |
|---|---|---|
| JP | 2014023753 | 2/2014 |
| TW | 200948426 | 12/2009 |
| TW | M384044 | 7/2010 |
| TW | 201043298 | 12/2010 |

(Continued)

OTHER PUBLICATIONS

Lawrence Fallon et al., "An Assessment of Sensing Technologies to Monitor the Collision of a Baseball and Bat", Proceedings of 7th ISEA Conference 2008, Jun. 2-6, 2008, pp. 1-6.

(Continued)

*Primary Examiner* — Nini F Legesse
(74) *Attorney, Agent, or Firm* — JCIPRNET

(57) ABSTRACT

A method and an apparatus for impact position detection of impact sport equipment are provided. The method includes following steps: retrieving a vibration signal generated by a vibration sensor detecting vibration caused by impact of impact sport equipment and a ball; performing a spectrum analysis on the vibration signal to obtain eigenfrequencies of the vibration signal in a frequency domain; and calculating at least one piece of characteristic information by using an amplitude of each eigenfrequency and inputting the same into a prediction model established in advance by using machine learning, so as to estimate an impact position of the ball on the impact sport equipment, in which the prediction model is trained by using characteristic information of multiple vibration signals and corresponding impact positions.

16 Claims, 7 Drawing Sheets

(56) References Cited

FOREIGN PATENT DOCUMENTS

| TW | 202118539 | 5/2021 |
|---|---|---|
| WO | 2020100163 | 5/2020 |

OTHER PUBLICATIONS

Takumi Osawa et al., "Position Estimation of Ball Impact in Baseball Batting Using PVDF Films", 2017 IEEE World Haptics Conference (WHC), Jun. 6-9, 2017, pp. 442-447.

Wei-Han Chen et al., "Impact Position Estimation for Baseball Batting with a Force-Irrelevant Vibration Feature", Sensors, Feb. 17, 2022, pp. 1-11.

"Office Action of Taiwan Counterpart Application", dated Aug. 8, 2021, p. 1-p. 15.

METHOD AND APPARATUS FOR IMPACT POSITION DETECTION OF IMPACT SPORT EQUIPMENT

CROSS-REFERENCE TO RELATED APPLICATION

This application claims the priority benefit of Taiwan application serial no. 111105528, filed on Feb. 16, 2022. The entirety of the above-mentioned patent application is hereby incorporated by reference herein and made a part of this specification.

BACKGROUND

Technical Field

The disclosure relates to a method and apparatus for position detection, and more particularly, to a method and apparatus for impact position detection of impact sport equipment.

DESCRIPTION OF RELATED ART

At present, the position detection of the contact point (i.e. batting spot) between the baseball and the bat when a baseball batter hits a ball is mainly determined by means of image processing. By setting up photographic equipment around the batter to retrieve the batter's shot images, and analyzing the images by using image processing methods such as feature extraction and comparison, the impact position is finally estimated.

However, the above method requires the use of high-cost high-speed camera equipment and adjustment to a special camera angle to clearly capture the batting spot. Also, because the action of hitting the ball changes at any time, the camera angle of the camera equipment cannot be adjusted in real time according to the action, and there are often blind spots in the actual shooting. In addition, performing position detection through image processing requires a relatively high amount of computation, especially when the number of image frames is large, the requirement for the computing power of the processing apparatus will also increase, resulting in increased costs.

SUMMARY

The disclosure provides a method and apparatus for impact position detection of impact sport equipment, in which the vibration of the impact sport equipment when a ball is hit is detected, and the eigenfrequencies of the vibrations are analyzed, such that the impact position can be accurately detected.

The disclosure provides a method for impact position detection of impact sport equipment for detecting, by using a vibration sensor mounted on impact sport equipment, an impact position by an apparatus for impact position detection of impact sport equipment including a processor. The method includes following steps. A vibration signal generated by the vibration sensor detecting a vibration generated by impact of the impact sport equipment and the ball is retrieved. A spectrum analysis is performed on the vibration signal to obtain a plurality of eigenfrequencies of the vibration signal in a frequency domain. At least one piece of characteristic information is calculated by using the amplitude of each of the eigenfrequencies and inputting the same into a prediction model established in advance by using machine learning, so as to estimate an impact position of the ball on the impact sport equipment, in which the prediction model is trained by using the characteristic information of multiple vibration signals and corresponding impact positions.

According to an embodiment of the disclosure, a step of calculating the at least one piece of characteristic information by using the amplitude of each of the eigenfrequencies includes the following: one primary eigenfrequency and at least one secondary eigenfrequency are selected according to the magnitude of the amplitude of the eigenfrequency, and the characteristic information is calculated by using the amplitude of the primary eigenfrequency as well as that of the at least one secondary eigenfrequency.

According to an embodiment of the disclosure, a step of calculating the characteristic information by using the amplitude of the primary eigenfrequency as well as that of the at least one secondary eigenfrequency includes the following: a ratio of the amplitude of the primary eigenfrequency with respect to that of each of the at least one secondary eigenfrequency is calculated as the characteristic information.

According to an embodiment of the disclosure, a step of calculating the characteristic information by using the amplitude of the primary eigenfrequency as well as that of the at least one secondary eigenfrequency further includes the following: a ratio of the amplitude of each of the at least one secondary eigenfrequency with respect to one another is calculated as the characteristic information.

According to an embodiment of the disclosure, a step of calculating the characteristic information by using the amplitude of the primary eigenfrequency as well as that of the at least one secondary eigenfrequency includes the following: a first eigenvalue is calculated by using the amplitude of the primary eigenfrequency, at least one second eigenvalue is calculated by using the amplitude of each of the at least one secondary eigenfrequency, and a ratio of the first eigenvalue with respect to each of the second eigenvalues is calculated as the characteristic information.

According to an embodiment of the disclosure, the method further includes the following. Multiple vibration signals generated by the vibration sensor detecting vibrations caused by impact of the ball at multiple preset impact positions on the impact sport equipment are retrieved. A spectrum analysis is performed on the vibration signals to obtain a plurality of eigenfrequencies of the vibration signals in the frequency domain, and the characteristic information is calculated by using the amplitude of each of the eigenfrequencies. The characteristic information are used as input of the prediction model and corresponding impact positions are used as output of the prediction model so as to train the prediction model, and multiple learning parameters of the trained prediction model are recorded.

The disclosure provides an apparatus for impact position detection of impact sport equipment, the apparatus including a data retrieving apparatus, a storage apparatus, and a processor. The data retrieving apparatus is connected to a vibration sensor mounted on impact sport equipment, the vibration sensor detecting a vibration of the impact sport equipment to generate a vibration signal. The storage apparatus stores multiple learning parameters of a prediction model established in advance by using machine learning, in which the prediction model is trained by using characteristic information of multiple vibration signals and corresponding impact positions, in which the impact position is a position where the impact of the impact sport equipment and a ball occurs. The processor is coupled to the data retrieving apparatus and the storage apparatus and is configured to: retrieve, by the data retrieving apparatus, the vibration signal generated by the vibration sensor detecting the vibration generated by impact of impact sport equipment and the ball; perform a spectrum analysis on the vibration signal to obtain a plurality of eigenfrequencies of the vibration signal in a frequency domain; and calculate at least one piece of characteristic information by using an amplitude of each of the eigenfrequencies and inputting the same into the prediction model, so as to estimate an impact position of the ball on the impact sport equipment.

According to an embodiment of the disclosure, the processor selects one primary eigenfrequency and at least one secondary eigenfrequency according to a magnitude of the amplitude of the eigenfrequency and calculates the characteristic information by using the amplitude of the primary eigenfrequency as well as that of the at least one secondary eigenfrequency.

According to an embodiment of the disclosure, the processor calculates a ratio of the amplitude of the primary eigenfrequency with respect to that of each of the at least one secondary eigenfrequency as the characteristic information.

In an embodiment of the disclosure, the processor further calculates a ratio of the amplitude of each of the at least one secondary eigenfrequency with respect to one another as the characteristic information.

According to an embodiment of the disclosure, the processor calculates a first eigenvalue by using the amplitude of the primary eigenfrequency, calculates at least one second eigenvalue by using the amplitude of each of the at least one secondary eigenfrequency, and calculates a ratio of the first eigenvalue with respect each of the second eigenvalues as the characteristic information.

According to an embodiment of the disclosure, the processor further retrieves, by the data retrieving apparatus, multiple vibration signals generated by the vibration sensor detecting vibrations generated by impact of the ball at multiple preset impact positions on the impact sport equipment; respectively performs a spectrum analysis on the vibration signals to obtain a plurality of eigenfrequencies of the vibration signals in the frequency domain; calculates the characteristic information by using the amplitude of each of the eigenfrequencies; and uses the characteristic information as input of the prediction model and uses the corresponding impact positions as output of the prediction model so as to train the prediction model and records the learning parameters of the trained prediction model in the storage apparatus.

According to an embodiment of the disclosure, the machine learning includes a decision tree, a convolutional neural network (CNN), a deep neural network (DNN), or a support vector machine (SVM).

According to an embodiment of the disclosure, the vibration sensor includes one or a combination of a piezoelectric vibration sensor, an electric vibration sensor, an eddy current vibration sensor, an inductive vibration sensor, a capacitive vibration sensor, a resistive vibration sensor, and a photoelectric vibration sensor.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
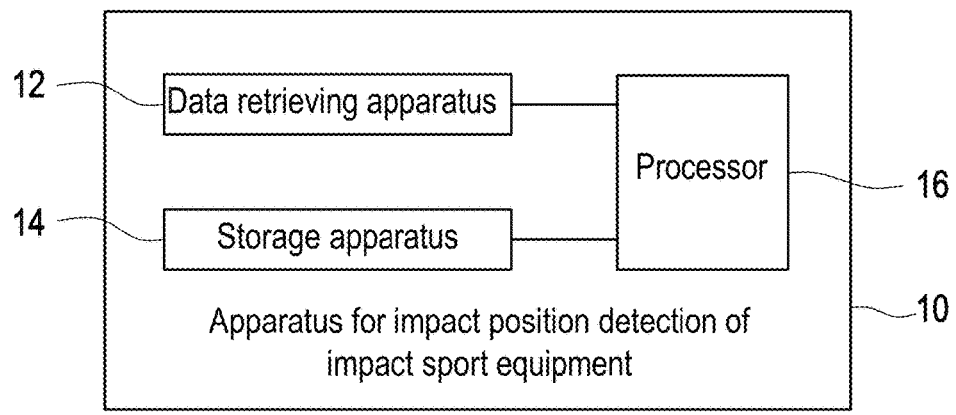
FIG. 1 is a block diagram of an apparatus for impact position detection of impact sport equipment according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Embodiments of the disclosure provide a method and apparatus for impact position detection of impact sport equipment, in which a vibration sensor is mounted on an impact sport equipment to detect a vibration of the impact sport equipment when a ball is hit, a spectrum analysis is performed on the vibration signal to obtain a plurality of eigenfrequencies in a frequency domain, and a relative feature of the eigenfrequencies is then input into a prediction model established in advance and trained by using machine learning, thereby estimating an impact position. In this manner, the impact position independent of batting force can be accurately calculated according to the embodiments of the disclosure.

In detail, FIG. 1 is a block diagram of an apparatus for impact position detection of impact sport equipment according to an embodiment of the disclosure. Referring to FIG. 1, an apparatus 10 for impact position detection of impact sport equipment according to the embodiment of the disclosure may be, for example, a computer apparatus having computing capability such as a file server, a database server, an application server, a workstation, or a personal computer, or may be a mobile apparatus such as a mobile phone, a tablet computers, or the like, including components such as a data retrieving apparatus 12, a storage apparatus 14, and a processor 16. The functions of the components are described as follows.

The data retrieving apparatus 12 may be, for example, any wired or wireless interface apparatus that may be connected to a vibration sensor mounted on the impact sport equipment, so as to retrieve a vibration signal generated by the vibration sensor detecting a vibration on the impact sport equipment. For wired mode, the data retrieving apparatus 12 may be a universal serial bus (USB), RS232, a universal asynchronous receiver/transmitter (UART), an inter-integrated circuit (I2C), a serial peripheral interface (SPI), a display port, or a thunderbolt interface, but the disclosure is not limited thereto. For wireless mode, the data retrieving apparatus 12 may be an apparatus supporting communication protocols such as wireless fidelity (Wi-Fi), RFID, bluetooth, infrared, near-field communication (NFC), or apparatus-to-apparatus (D2D), and the disclosure is also not limited thereto. The vibration sensor may be, for example, one or a combination of a piezoelectric vibration sensor, an electric vibration sensor, an eddy current vibration sensor, an inductive vibration sensor, a capacitive vibration sensor, a resistive vibration sensor, and a photoelectric vibration sensor mounted on or attached to the knob, barrel, or any other position of the impact sport equipment. The type and configuration of the sensor are not limited in the embodiment.

Figure 2:
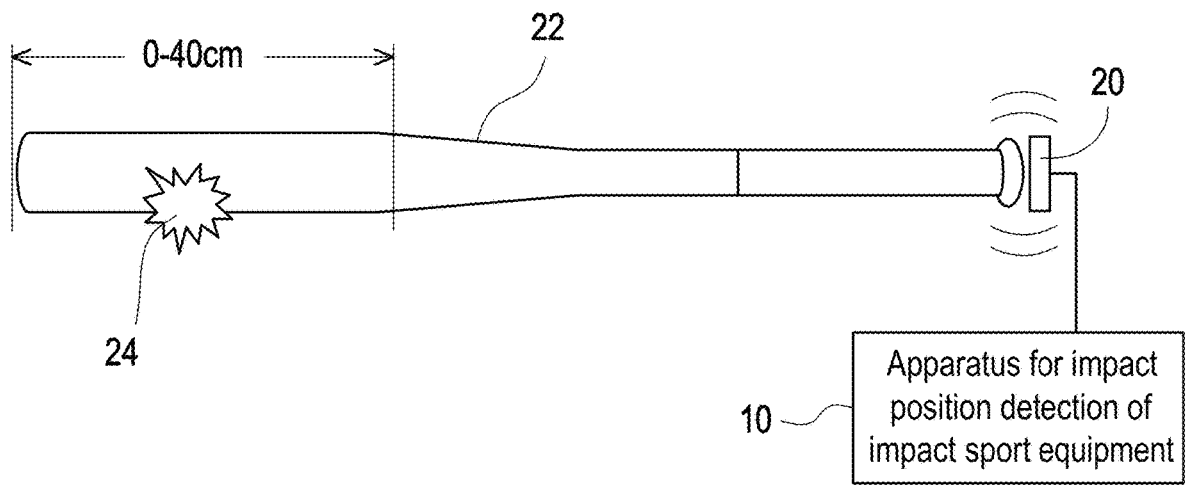
FIG. 2 is a schematic diagram illustrating a configuration of a vibration sensor according to an embodiment of the disclosure.

For example, FIG. 2 is a schematic diagram illustrating a configuration of a vibration sensor according to an embodiment of the disclosure. Referring to FIG. 2, according to an embodiment of the disclosure, for example, a piezoelectric vibration sensor 20 is mounted on the knob of a baseball bat 22 to detect a vibration generated when the baseball bat 22 hits a ball and a vibration signal generated thereby, the piezoelectric vibration sensor 20 transmits the vibration signal to the apparatus 10 for impact position detection of impact sport equipment, and an impact position 24 is calculated by the apparatus 10 for impact position detection of impact sport equipment. In this embodiment, the piezoelectric vibration sensor 20 is made of a relatively thin and light piezoelectric material, so the vibration of the bat can be detected without affecting the grip and characteristics of the bat. Note that although this embodiment takes a baseball bat as an example, but the disclosure is not limited thereto. The embodiments of the disclosure can be applied to a variety of impact sport equipment such as softball bats, badminton rackets, tennis rackets, billiard rackets, hockey sticks, golf clubs, and the like, with no limit imposed in the disclosure.

The storage apparatus 14 may be, for example, any type of fixed or removable random access memory (RAM), read-only memory (ROM), flash memory, hard disk, similar elements, or a combination of the above elements so as to store a computer program executable by the processor 16. In some embodiments, the storage apparatus 14 further stores learning parameters of a prediction model established in advance and trained by the processor 16 by using machine learning. In some embodiments, the storage apparatus 14 may be configured to temporarily store the learning parameters of the prediction model that is established in advance and trained by using machine learning by the processor 16, which are downloaded from a cloud server or a remote apparatus by using the data retrieving apparatus 12. The machine learning includes a decision tree, a convolutional neural network (CNN), a deep neural network (DNN), or a support vector machine (SVM), but the disclosure is not limited thereto.

The processor 16 may be, for example, a central processing unit (CPU), or other programmable general-purpose or special-purpose microprocessors, microcontrollers, digital signal processors (DSP), programmable controllers, application specific integrated circuits (ASIC), programmable logic apparatuses (PLD), other similar apparatuses, or a combination of the apparatuses; the disclosure is not limited thereto. In this embodiment, the processor 16 may load a computer program from the storage apparatus 14 to execute the method for impact position detection according to the machine learning of the embodiment of the disclosure.

Figure 3:
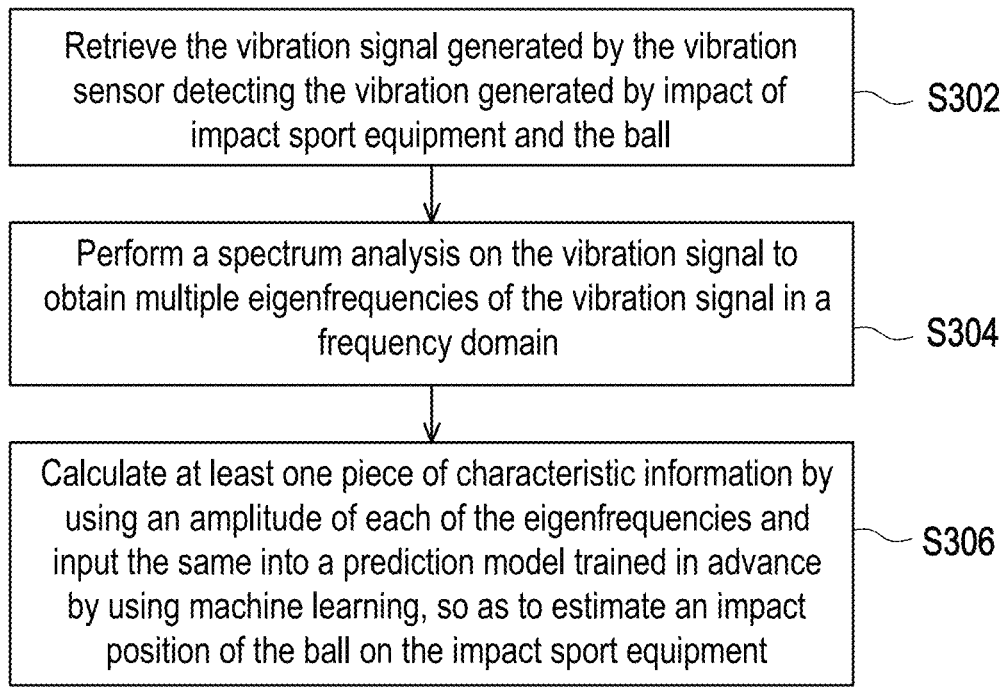
FIG. 3 is a flowchart of a method for impact position detection of impact sport equipment according to an embodiment of the disclosure.

FIG. 3 is a flowchart of a method for impact position detection of impact sport equipment according to an embodiment of the disclosure. Referring to FIG. 1 and FIG. 3 at the same time, the method of the present embodiment is applicable to the apparatus 10 for impact position detection of impact sport equipment. The following is a description of detailed steps of the method for impact position detection of impact sport equipment in conjunction of various components of the apparatus 10 for impact position detection of impact sport equipment of the present embodiment.

In step S302, the processor 16 of the apparatus 10 for impact position detection of impact sport equipment retrieves, by the data retrieving apparatus 12, the vibration signal generated by the vibration sensor detecting the vibration generated by impact of impact sport equipment and the ball. The vibration signal may be, for example, standardized energy in a time domain measured by the vibration sensor when the impact sport equipment vibrates.

In step S304, the processor 16 performs a spectrum analysis on the vibration signal to obtain a plurality of eigenfrequencies of the vibration signal in a frequency domain. The processor 16 performs, for example, a frequency domain analysis method such as Fourier transform or wavelet transform on the vibration signal, but the disclosure is not limited thereto. In other embodiments, the process 16 may use any kind of frequency domain analysis method to convert the vibration signal into a frequency domain signal, and measure multiple peaks in the frequency domain signal as the eigenfrequencies.

In step S306, the processor 16 calculates at least one piece of characteristic information by using an amplitude of each of the eigenfrequencies and inputs the same into a prediction model trained in advance by using machine learning, so as to estimate an impact position of the ball on the impact sport equipment. The processor 16, for example, selects one primary eigenfrequency and at least one secondary eigenfrequency according to a magnitude of the amplitude of the eigenfrequency and calculates the characteristic information by using the amplitude of the primary eigenfrequency as well as that of the at least one secondary eigenfrequency. The characteristic information may be, for example, a relative feature of the eigenfrequencies, such as a ratio of the amplitude of the primary eigenfrequency with respect that of each of the at least one secondary eigenfrequency, so as to eliminate the effect of strength of the batting force.

For example, in some embodiments, the processor 16 may perform a normalization on the amplitudes of a plurality of eigenfrequencies (i.e. divide each amplitude by the peak thereof), and, from these eigenfrequencies, select first three eigenfrequencies having peak amplitudes ($M_1$, $M_2$, $M_3$ in sequence) and calculating ratios $M_1/M_2$ and $M_1/M_3$ of the first peak amplitude $M_1$ with respect to other amplitudes $M_2$ and $M_3$ as the characteristic information of the impact sport equipment. In some embodiments, the processor 16 may use only the ratio $M_1/M_2$ of the peak amplitude $M_1$ with respect to the second peak amplitude $M_2$ as the characteristic information of the impact sport equipment. In some embodiments, the processor 16 may further calculate the ratio $M_2/M_3$ of the amplitudes $M_2$ and $M_3$, and use the same together with the aforementioned ratios $M_1/M_2$ and $M_1/M_3$ as the characteristic information of the impact sport equipment. The above embodiment is used only to illustrate possible implementations of the disclosure, and is not intended to limit the disclosure.

On the other hand, the prediction model may be, for example, a machine learning model trained in advance by using the characteristic information of multiple vibration signals and multiple corresponding impact positions. In detail, the prediction model require a decision criterion to determine which feature and regression equation to use. Since ratios of the amplitudes having different characteristic information have different distribution, the embodiments of the disclosure can implement a high-precision prediction model through advanced methods such as a decision tree regressor or deep machine learning.

Figure 4:
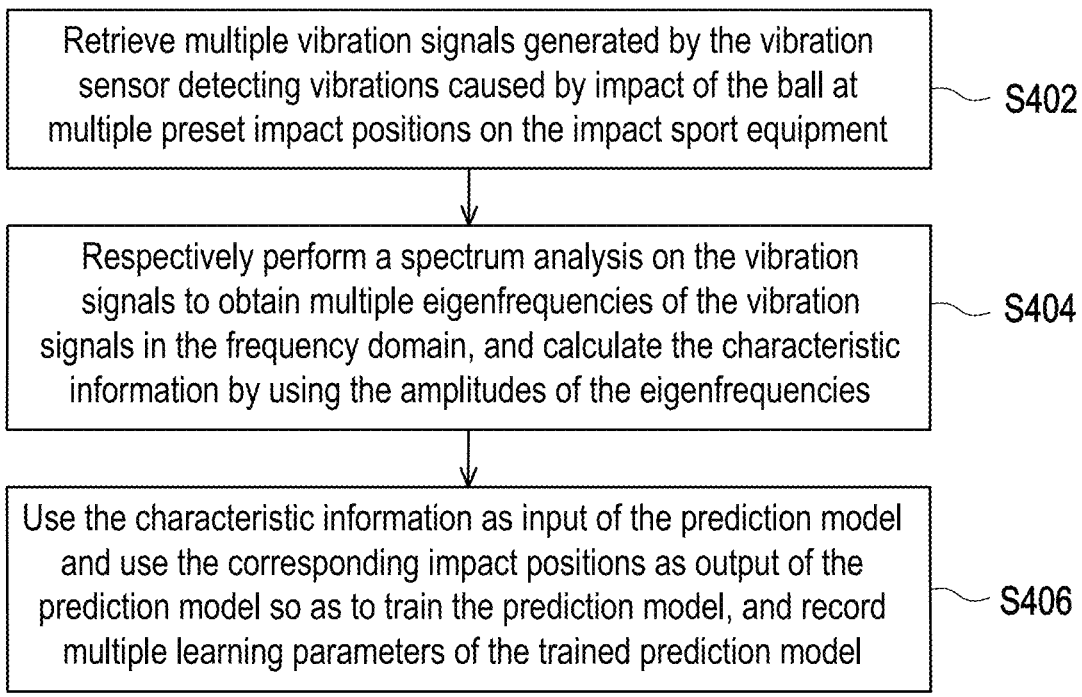
FIG. 4 is a flowchart of a method for training a prediction model by using machine learning according to an embodiment of the disclosure.

In detail, FIG. 4 is a flowchart of a method for training a prediction model by using machine learning according to an embodiment of the disclosure. Referring to FIG. 1 and FIG. 4 at the same time, the method of this embodiment is applicable to the apparatus 10 for impact position detection of impact sport equipment.

In step S402, the processor 16 of the apparatus 10 for impact position detection of impact sport equipment retrieves, by the data retrieving apparatus 12, multiple vibration signals generated by the vibration sensor detecting vibrations caused by impact of the ball at multiple preset impact positions on the impact sport equipment. In this embodiment, for example, 40 impact positions are evenly distributed within 40 cm (as shown in FIG. 2) from the end of the barrel of the impact sport equipment (for example, one impact position every 1 cm), the impact positions are hit in sequence by the ball, and the vibration sensor is mounted to detect the vibration signals generated by the vibrations caused when the impact sport equipment is hit. The processor 16 retrieves the vibration signals by the data retrieving apparatus 12.

In step S404, the processor 16 respectively performs a spectrum analysis on the vibration signals to obtain a plurality of eigenfrequencies of the vibration signals in the frequency domain, and calculates the characteristic information by using the amplitude of each of the eigenfrequencies. Using similar calculation method of the aforementioned characteristic information, the processor 16 may, for example, select one primary eigenfrequency and at least one secondary eigenfrequency according to the amplitude of the eigenfrequency and calculate the characteristic information by using the amplitude of the primary eigenfrequency as well as that of the at least one secondary eigenfrequency by, for example: calculating a ratio of the amplitude of the primary eigenfrequency with respect to that of each of the at least one secondary eigenfrequency as the characteristic information, and calculating a ratio of the amplitude of each of the at least one secondary eigenfrequency with respect to one another as the characteristic information, but the disclosure is not limited thereto.

In step S406, the processor 16 uses the calculated characteristic information as input of the prediction model and uses the corresponding impact positions as output of the prediction model so as to train the prediction model, and records multiple learning parameters of the trained prediction model in the storage apparatus 14.

After establishing the feature distribution of the impact sport equipment with the prediction model, the apparatus 10 for impact position detection of impact sport equipment according to the embodiment of the disclosure can accurately locate the batting spot by converting the detected vibration signals into the characteristic information and inputting the same into the prediction model each time the impact sport equipment hits the ball. In some embodiments, the apparatus 10 for impact position detection of impact sport equipment may, for example, individually establish a prediction model for different types of impact sport equipment (such as wooden sticks, aluminum sticks) and store the same in the storage apparatus 14, such that a corresponding prediction model can be accessed from the storage apparatus 14 so as to detect the impact position during actual battings. In this manner, the accuracy of the detected impact position can be increased.

Figure 5:
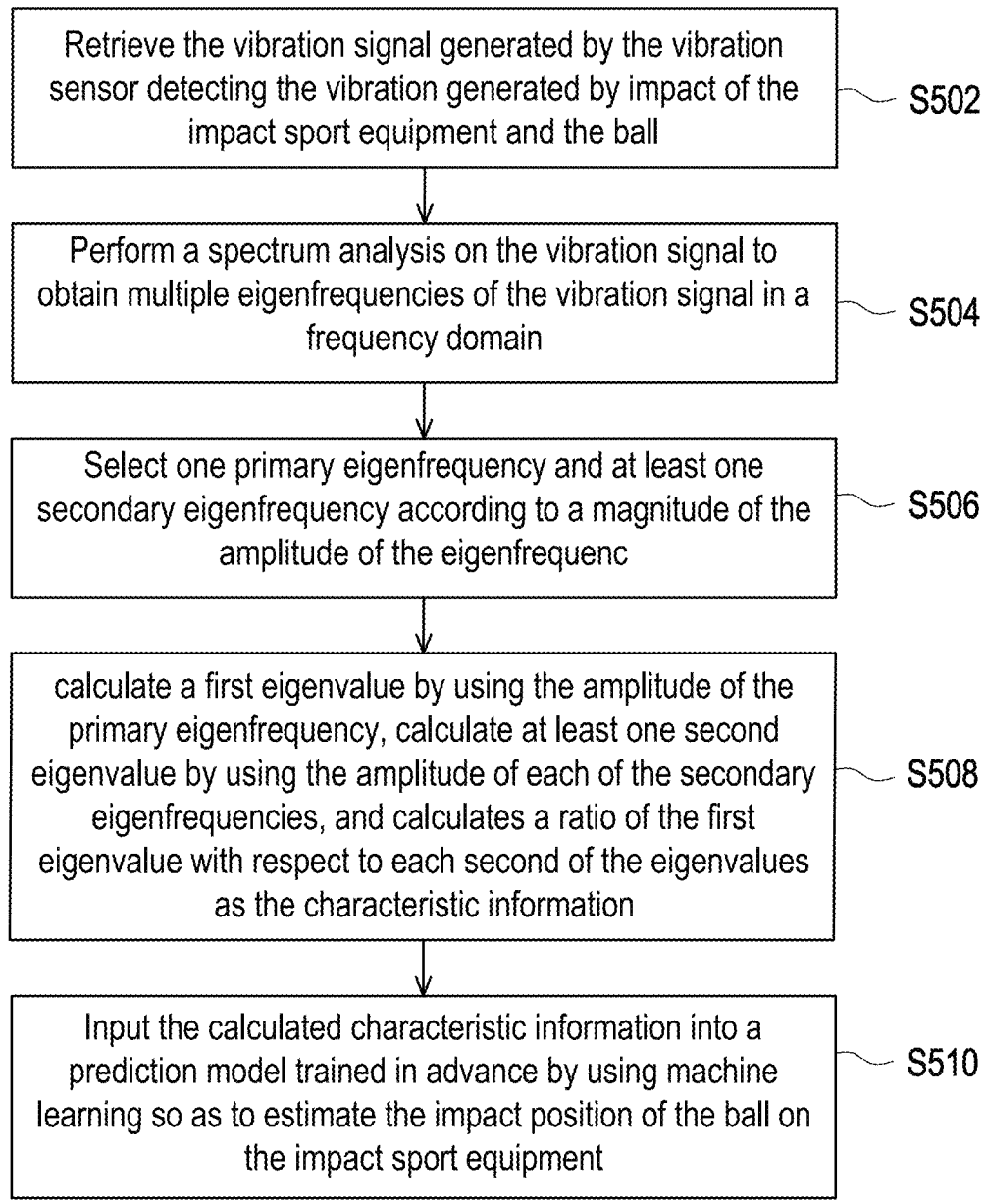
FIG. 5 is a flowchart of a method for impact position detection of impact sport equipment according to an embodiment of the disclosure.

FIG. 5 is a flowchart of a method for impact position detection of impact sport equipment according to an embodiment of the disclosure. Referring to FIG. 1 and FIG. 5 at the same time, the method of the present embodiment is applicable to the above-mentioned apparatus 10 for impact position detection of impact sport equipment. The following is a description of the detailed steps of the method for impact position detection of impact sport equipment in conjunction of various components of the apparatus 10 for impact position detection of impact sport equipment of the present embodiment.

In step S502, the processor 16 of the apparatus 10 for impact position detection of impact sport equipment retrieves, by the data retrieving apparatus 12, the vibration signal generated by the vibration sensor detecting the vibration generated by impact of the impact sport equipment and the ball. In step S504, the processor 16 performs a spectrum analysis on the vibration signal to obtain a plurality of eigenfrequencies of the vibration signal in a frequency domain. The steps S502 to S504 are the same as or similar to the steps S302 to S304 of the foregoing embodiment, therefore the detailed contents thereof will not be repeated herein.

Different from the previous embodiment, in this embodiment, the processor 16 selects one primary eigenfrequency and at least one secondary eigenfrequency according to a magnitude of the amplitude of the eigenfrequency in step S506, and calculates a first eigenvalue by using the amplitude of the primary eigenfrequency, calculates at least one second eigenvalue by using the amplitude of each of the at least one secondary eigenfrequency, and calculates a ratio of the first eigenvalue with respect to each of the second eigenvalues as the characteristic information in step S508. For example, the processor 16 may calculate the square, square root, or other power of the amplitude of the primary eigenfrequency as the first eigenvalue, calculate the square, square root, or other power of the amplitude of the at least one secondary eigenfrequency accordingly as the second eigenvalue, and then calculating a ratio of the first eigenvalue with respect to each of the second eigenvalues as the characteristic information. This embodiment does not limit the calculation method of the eigenvalue.

In step S510, the processor 16 inputs the calculated characteristic information into a prediction model trained in advance by using machine learning so as to estimate the impact position of the ball on the impact sport equipment. The processor 16, for example, calculates the characteristic information of the multiple vibration signals in the same way and uses the same to train the prediction model, so as to obtain the precise impact position.

Through the prediction model, the apparatus 10 for impact position detection of impact sport equipment according to the embodiment of the disclosure can also accurately locate the batting spot by converting the detected vibration signals into the characteristic information and inputting the same into the prediction model each time the impact sport equipment hits the ball.

Figure 6A:
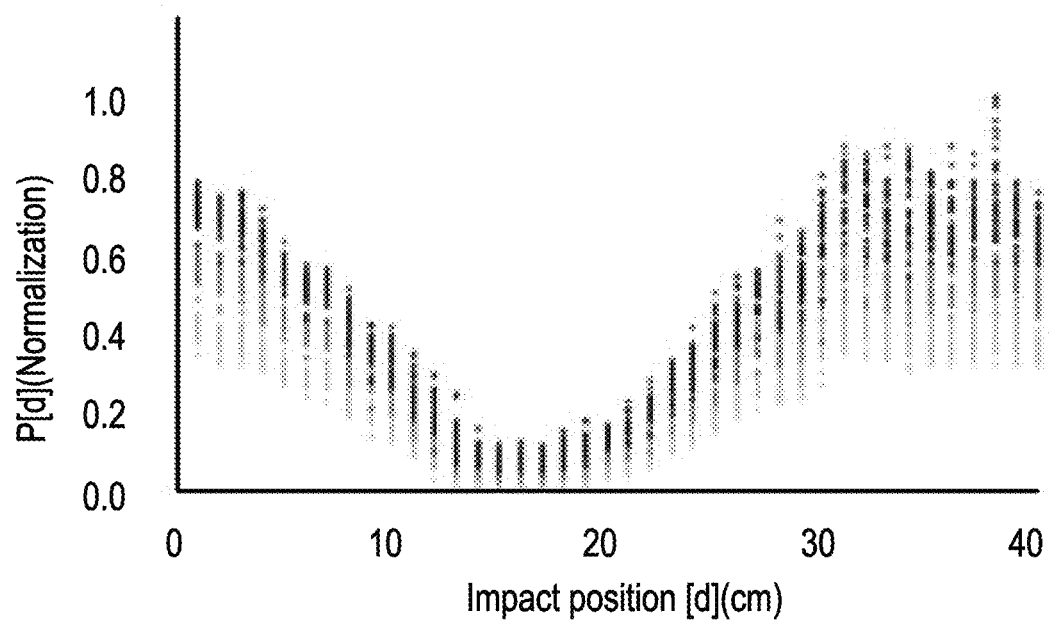
FIGS. 6A to 6G are examples of a method for a batting spot detection of a bat according to an embodiment of the disclosure.

FIGS. 6A to 6G are examples of a method for batting position detection of a bat according to an embodiment of the disclosure. In this embodiment, for example, the ball is used to hit the bat at multiple impact positions d with three different strengths: strong, medium and weak (where d represents positions of every 1 cm within 40 cm from the end of the barrel), and the vibration sensor is mounted to detect a vibration of the bat during batting, so as to obtain a vibration signal P[d] in a time domain as shown in FIG. 6A. Each dot in the vibration signal P[d] indicates the impact intensity with a value between 0.0 and 1.0 after normalization. Black dots indicate impact intensity obtained by using the ball to hit the bat with strong force, dark gray dots indicate impact intensity obtained by using the ball to hit the bat with medium force, and light gray dots represent the impact intensity obtained by using the ball to hit the bat with weak force.

Figure 6B:
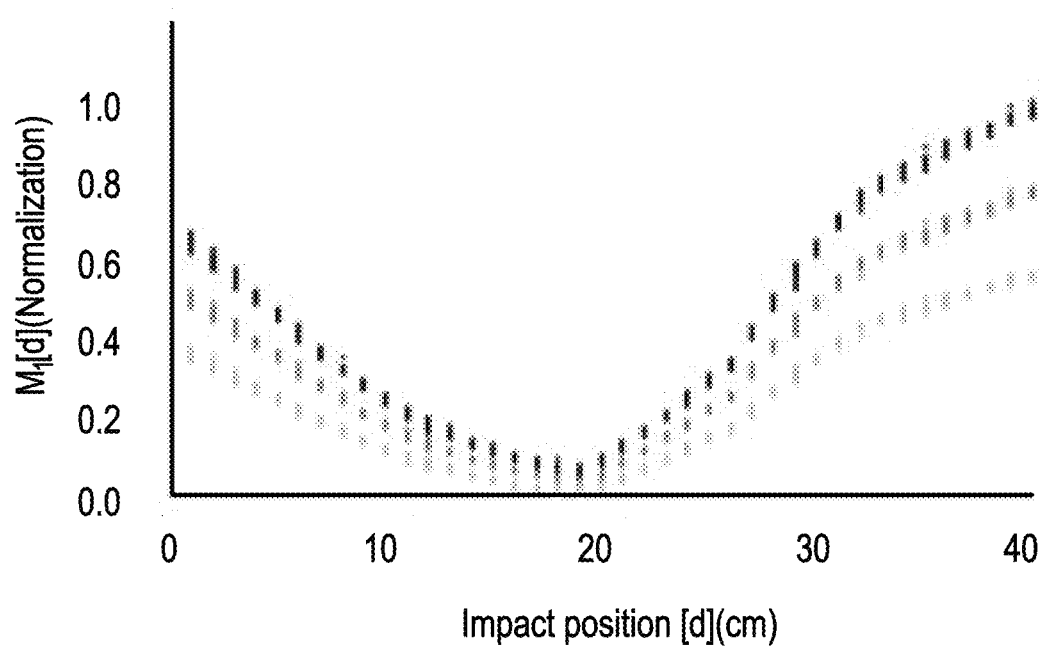
Figure 6C:
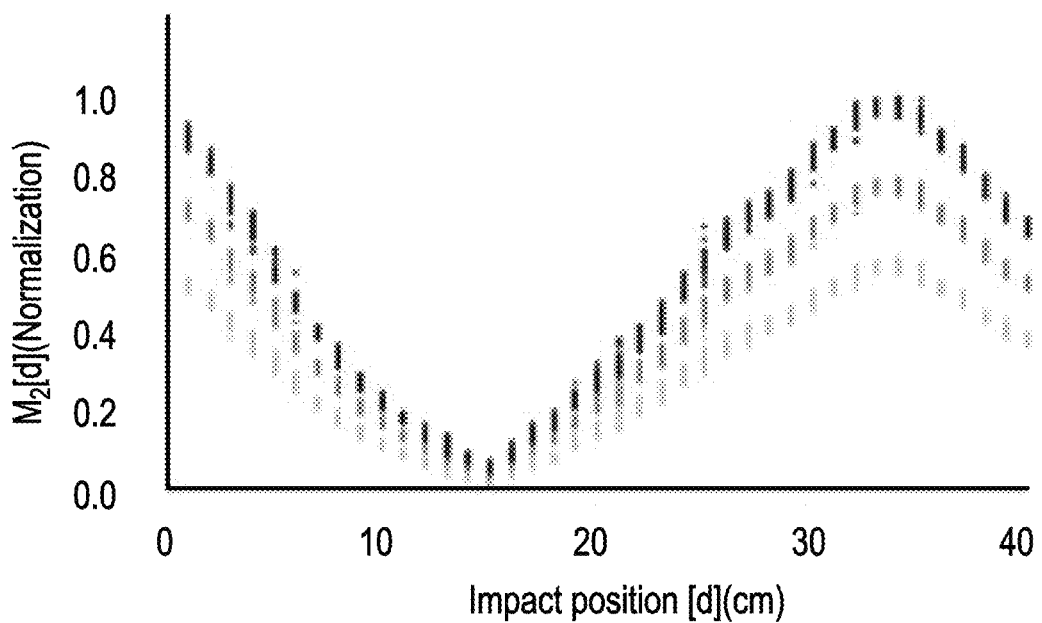
Figure 6D:
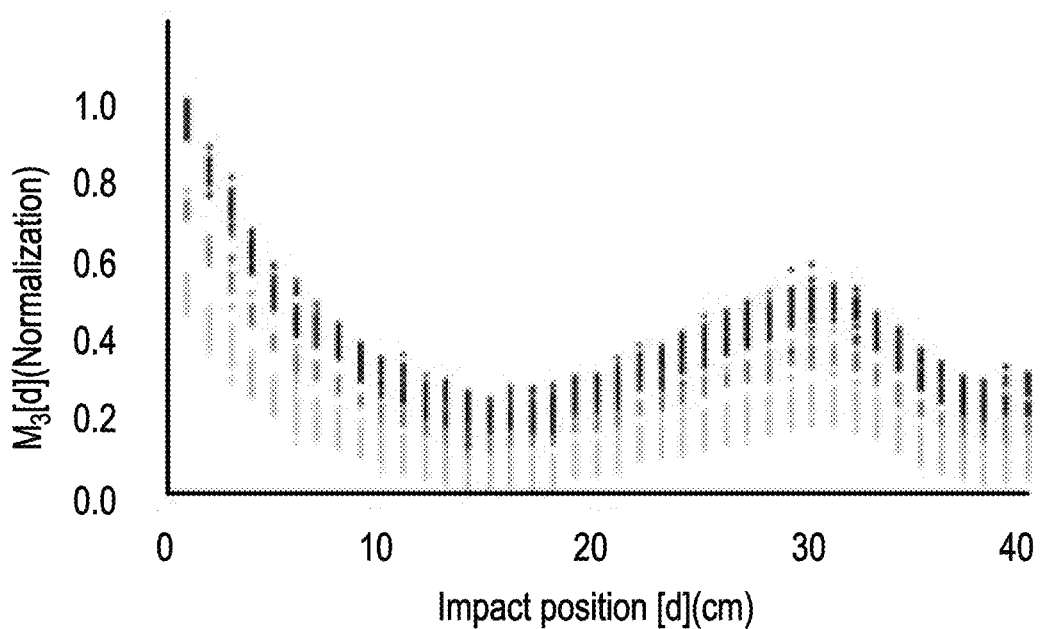

Then, a spectrum analysis is performed on the vibration signal P[d] to obtain a plurality of eigenfrequencies in the frequency domain and normalization is performed on the amplitudes of the eigenfrequencies, so as to obtain the distribution of the first three eigenfrequencies having peak amplitudes according to the impact positions d, including a distribution of the peak amplitude $M_1[d]$ shown in FIG. 6B, a distribution of the second peak amplitude $M_2[d]$ shown in FIG. 6C, and a distribution of the third peak amplitude $M_3[d]$ shown in 6D.

Figure 6E:
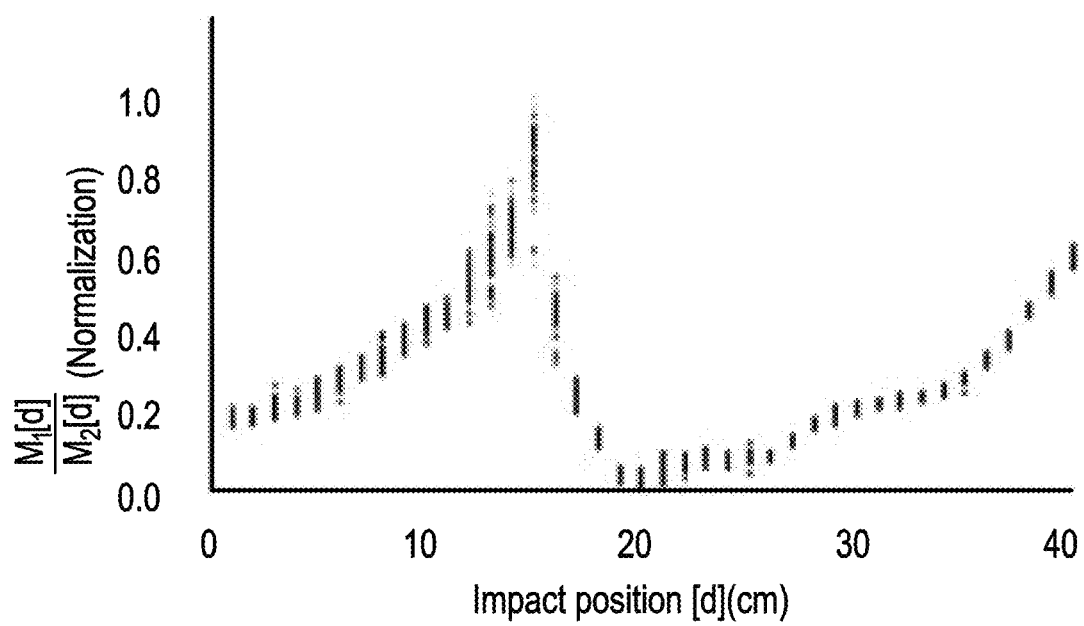
Figure 6F:
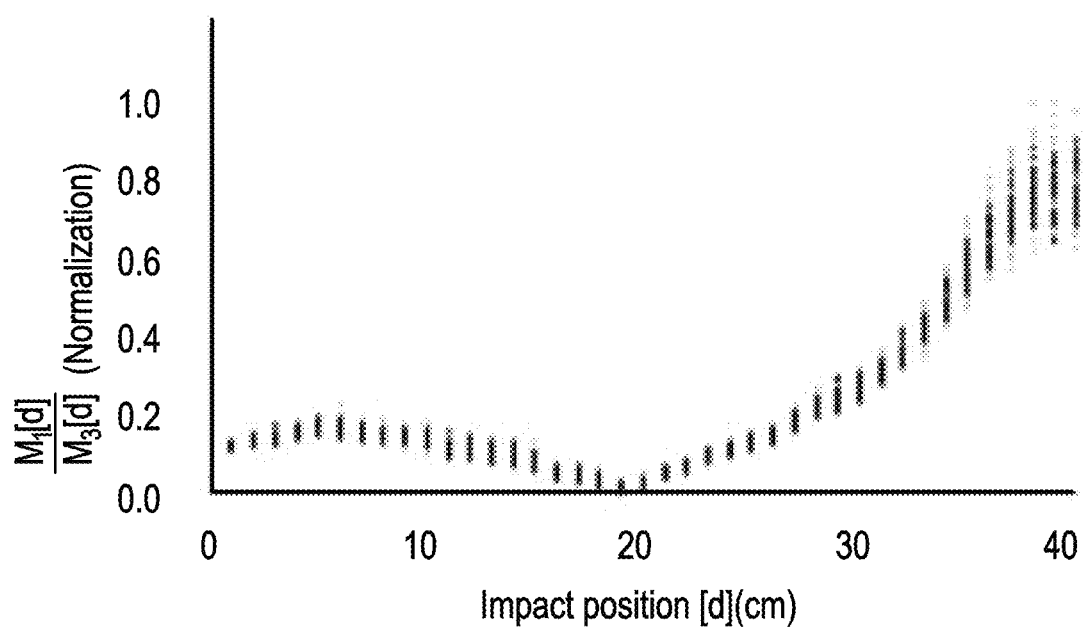
Figure 6G:
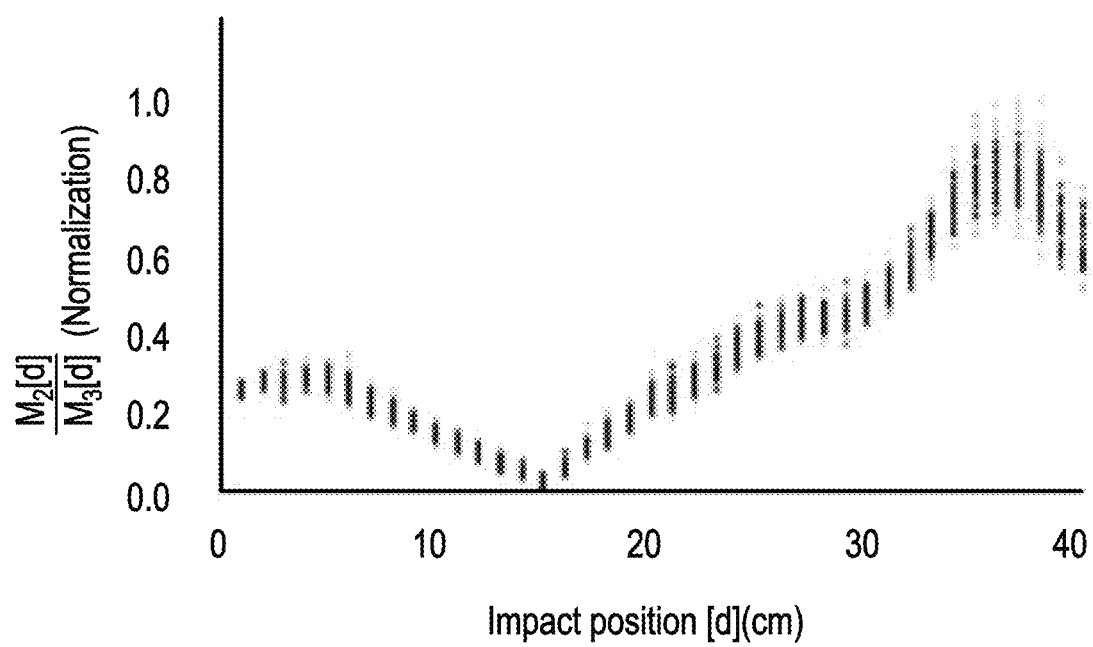

Then, by calculating a ratio of each of the amplitudes $M_1[d]$, $M_2[d]$, and $M_3[d]$ with respect to one another, the distribution of at least one piece of characteristic information of the bat according to the impact positions d may be obtained, including the distribution of characteristic information $M_1[d]/M_2[d]$ shown in FIG. 6E, the distribution of characteristic information $M_1[d]/M_3[d]$ shown in FIG. 6F, and the distribution of characteristic information $M_2[d]/M_3[d]$ shown in FIG. 6G. It can be seen from FIGS. 6E to 6G that, through ratio calculation, the effect of impact intensity on the characteristic information can be eliminated in this embodiment.

Finally, by using the characteristic information $M_1[d]/M_2[d]$, $M_1[d]/M_3[d]$, $M_2[d]/M_3[d]$ and the corresponding impact positions d as input and output, respectively so as to train the prediction model established by using machine learning, a prediction model with the characteristics of the bat recorded can be obtained, which is used as a basis for subsequent detection of the impact position.

In summary, according to the method and apparatus for impact position detection of impact sport equipment according to the embodiments of the disclosure, a vibration sensor is mounted on the impact sport equipment to detect the vibration of the impact sport equipment when a ball is hit, and a prediction model responsive to the characteristics of the impact sport equipment is established in advance by using the relative features of the vibration signals in the frequency domain. In this manner, whenever the same or the same type of impact sport equipment is used to hit a ball, the impact position can be accurately calculated by inputting the relative features of the vibration signals into the corresponding prediction model.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for impact position detection of impact sport equipment, detecting, by using a vibration sensor mounted on impact sport equipment, an impact position by an apparatus for impact position detection of impact sport equipment comprising a processor, the method comprising following steps:
retrieving a vibration signal generated by the vibration sensor detecting a vibration caused by impact of the impact sport equipment and a ball;
performing a spectrum analysis on the vibration signal to obtain a plurality of eigenfrequencies of the vibration signal in a frequency domain; and
calculating at least one piece of characteristic information by using an amplitude of each of the eigenfrequencies and inputting the same into a prediction model established in advance by using machine learning, so as to estimate an impact position of the ball on the impact sport equipment, wherein the prediction model is trained by using the characteristic information of multiple vibration signals and corresponding impact positions.

2. The method according to claim 1, wherein a step of calculating the at least one piece of characteristic information by using the amplitude of each of the eigenfrequencies comprises:
selecting one primary eigenfrequency and at least one secondary eigenfrequency according to the magnitude of the amplitude of the eigenfrequency and calculating the characteristic information by using the amplitude of the primary eigenfrequency as well as that of the at least one secondary eigenfrequency.

3. The method according to claim 2, wherein a step of calculating the characteristic information by using the amplitude of the primary eigenfrequency as well as that of the at least one secondary eigenfrequency comprises:
calculating a ratio of the amplitude of the primary eigenfrequency with respect to that of each of the at least one secondary eigenfrequency as the characteristic information.

4. The method according to claim 3, wherein a step of calculating the characteristic information by using the amplitude of the primary eigenfrequency as well as that of the at least one secondary eigenfrequency further comprises:
calculating a ratio of the amplitude of each of the at least one secondary eigenfrequency with respect to one another as the characteristic information.

5. The method according to claim 2, wherein a step of calculating the characteristic information by using the amplitude of the primary eigenfrequency as well as that of the at least one secondary eigenfrequency comprises:
calculating a first eigenvalue by using the amplitude of the primary eigenfrequency, calculating at least one second eigenvalue by using the amplitude of each of the at least one secondary eigenfrequency, and calculating a ratio of the first eigenvalue with respect to each of the second eigenvalues as the characteristic information.

6. The method according to claim 1, further comprising:
retrieving multiple vibration signals generated by the vibration sensor detecting vibrations caused by impact of the ball at multiple preset impact positions on the impact sport equipment;
respectively performing a spectrum analysis on the vibration signals to obtain a plurality of eigenfrequencies of the vibration signals in the frequency domain, and calculating the characteristic information by using the amplitude of each of the eigenfrequencies; and
using the characteristic information as input of the prediction model and using the corresponding impact positions as output of the prediction model so as to train the prediction model, and recording multiple learning parameters of the trained prediction model.

7. A method according to claim 1, wherein the machine learning comprises a decision tree, a convolutional neural network (CNN), a deep neural network (DNN), or a support vector machine (SVM).

8. A method according to claim 1, wherein the vibration sensor comprises one or a combination of a piezoelectric vibration sensor, an electric vibration sensor, an eddy current vibration sensor, an inductive vibration sensor, a capacitive vibration sensor, a resistive vibration sensor, and a photoelectric vibration sensor.

9. An apparatus for impact position detection of impact sport equipment, the apparatus comprising:
a data retrieving apparatus, connected to a vibration sensor mounted on impact sport equipment, the vibration sensor detecting a vibration of the impact sport equipment to generate a vibration signal;
a storage apparatus, storing multiple learning parameters of a prediction model established in advance by using machine learning, wherein the prediction model is trained by using characteristic information of multiple vibration signals and corresponding impact positions, wherein the impact position is a position where the impact of the impact sport equipment and a ball occurs; and
a processor, coupled to the data retrieving apparatus and the storage apparatus and configured to:
retrieve, by the data retrieving apparatus, the vibration signal generated by the vibration sensor detecting the vibration generated by impact of impact sport equipment and the ball;
perform a spectrum analysis on the vibration signal to obtain a plurality of eigenfrequencies of the vibration signal in a frequency domain; and
calculate at least one piece of characteristic information by using an amplitude of each of the eigenfrequencies and inputting the same into the prediction model, so as to estimate an impact position of the ball on the impact sport equipment.

10. The apparatus for impact position detection of impact sport equipment according to claim 9, wherein the processor selects one primary eigenfrequency and at least one secondary eigenfrequency according to a magnitude of the amplitude of the eigenfrequency and calculates the characteristic information by using the amplitude of the primary eigenfrequency as well as that of the at least one secondary eigenfrequency.

11. The apparatus for impact position detection of impact sport equipment according to claim 10, wherein the processor calculates a ratio of the amplitude of the primary eigenfrequency with respect to that of each of the at least one secondary eigenfrequency as the characteristic information.

12. The apparatus for impact position detection of impact sport equipment according to claim 11, wherein the processor further calculates a ratio of the amplitude of each of the at least one secondary eigenfrequency with respect to one another as the characteristic information.

13. The apparatus for impact position detection of impact sport equipment according to claim 10, the processor calculates a first eigenvalue by using the amplitude of the primary eigenfrequency, calculates at least one second eigenvalue by using the amplitude of each of the at least one secondary eigenfrequency, and calculates a ratio of the first eigenvalue with respect to each of the second eigenvalues as the characteristic information.

14. The apparatus for impact position detection of impact sport equipment according to claim 9, wherein the processor further retrieves, by the data retrieving apparatus, multiple vibration signals generated by the vibration sensor detecting vibrations generated by impact of the ball at multiple preset impact positions on the impact sport equipment; respectively perform a spectrum analysis on the vibration signals to obtain a plurality of eigenfrequencies of the vibration signals in the frequency domain; calculate the characteristic information by using the amplitude of each of the eigenfrequencies; and use the characteristic information as input of the prediction model and use the corresponding impact positions as output of the prediction model so as to train the prediction model and record multiple learning parameters of the trained prediction model in the storage apparatus.

15. The apparatus for impact position detection of impact sport equipment according to claim 9, wherein the machine learning comprises a decision tree, a convolutional neural network, a deep neural network, or a support vector machine.

16. The apparatus for impact position detection of impact sport equipment according to claim 9, the vibration sensor comprises one or a combination of a piezoelectric vibration sensor, an electric vibration sensor, an eddy current vibration sensor, an inductive vibration sensor, a capacitive vibration sensor, a resistive vibration sensor, and a photoelectric vibration sensor.

* * * * *